(12) United States Patent
Mimura et al.

(10) Patent No.: US 7,817,361 B2
(45) Date of Patent: Oct. 19, 2010

(54) BEAM DIRECTION CONTROL ELEMENT AND METHOD OF MANUFACTURING SAME

(75) Inventors: Koji Mimura, Kanagawa (JP); Ken Sumiyoshi, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 227 days.

(21) Appl. No.: 11/746,516

(22) Filed: May 9, 2007

(65) Prior Publication Data
US 2007/0268586 A1 Nov. 22, 2007

(30) Foreign Application Priority Data

May 16, 2006 (JP) ............................. 2006-137094
Sep. 28, 2006 (JP) ............................. 2006-265087

(51) Int. Cl.
*G02B 5/02* (2006.01)
*G02B 13/20* (2006.01)

(52) U.S. Cl. .................. 359/885; 359/614; 359/613
(58) Field of Classification Search ................ 430/319, 430/320; 359/599
See application file for complete search history.

(56) References Cited

U.S. PATENT DOCUMENTS

| | | | | |
|---|---|---|---|---|
| 6,398,370 | B1 * | 6/2002 | Chiu et al. ................. | 359/613 |
| 2001/0013920 | A1 * | 8/2001 | Hashimoto et al. .......... | 349/187 |
| 2007/0139765 | A1 * | 6/2007 | Daniel et al. ................ | 359/443 |

FOREIGN PATENT DOCUMENTS

| | | |
|---|---|---|
| JP | 57-53703 A | 3/1982 |
| JP | 63-77001 A | 4/1988 |
| JP | 06-294903 A | 10/1994 |
| JP | 06-305066 A | 11/1994 |
| JP | 3043069 B2 | 3/2000 |
| JP | 2000-171617 A | 6/2000 |
| JP | 2002-71914 A | 3/2002 |
| JP | 2003-510630 A | 3/2003 |
| JP | 2004-110016 A | 4/2004 |
| JP | 2004-514167 A | 5/2004 |
| JP | 2005-72662 A | 3/2005 |
| KR | 2002-0055587 A | 7/2002 |
| KR | 2003-0048148 A | 6/2003 |
| KR | 10-2006-0001255 A | 1/2006 |
| WO | WO 92/11549 | 7/1992 |
| WO | WO 02/41048 | 5/2002 |
| WO | WO 2005/079330 A2 | 9/2005 |

OTHER PUBLICATIONS

Translation JP-06-305066(Nov. 1994).*
J.M. Shaw et al., "Negative Photoresists for Optical Lithography", IBM J. RES Develop., vol. 41, No. 1/2, pp. 81-94 (1997).

* cited by examiner

*Primary Examiner*—John A McPherson
*Assistant Examiner*—Anna L Verderame
(74) *Attorney, Agent, or Firm*—Sughrue Mion, PLLC

(57) ABSTRACT

A beam direction control element has transparent areas and light absorption areas alternately arranged on a surface of a substrate, wherein the light absorption areas function as a louver for controlling the direction of a beam of light. The beam direction control element is manufactured by disposing an optically transparent material on a first transparent substrate to form transparent ridges which constitute the transparent areas, filling curable and photo-absorptive fluid in gaps between the transparent ridges, and then curing the fluid to form the light absorption areas.

5 Claims, 12 Drawing Sheets

BEAM DIRECTION CONTROL ELEMENT AND METHOD OF MANUFACTURING SAME

BACKGROUND OF THE INVENTION

1. Field of the Invention

The present invention relates to a beam direction control element for controlling the directivity of emitted light, i.e., a louver, a method of manufacturing the same, and a variety of devices which employ such a beam direction control element.

2. Description of the Related Arts

Liquid crystal displays (LCDs) are characterized by slim shape, light weight, and low power consumption, and therefore widely employed in various devices such as a thin type television set, a personal digital assistant (PDA), a notebook type personal computer and the like as their display units. Conventional LCDs largely depend on the viewing angle in their display definition, which results in such problems as an inverted image or an invisible image depending on the angle at which one views the screen. In recent years, however, with advancing developments of a compensation film for overcoming the viewing angle dependence and display schemes such as an in-plane switching (IPS) scheme using a horizontal electric field, a vertical alignment (VA) scheme using vertical alignment, and the like, LCDs have been realized to eliminate the viewing angle dependence at any viewing angle, and have a wide range of viewing angle even comparable to a cathode ray tube (CRT). Such LCDs become increasingly popular.

A personal digital assistant, which excels in portability, can be used in a conference or the like in a situation, where a screen displayed on the personal digital assistant is shared by a plurality of persons. Otherwise, the personal digital assistants are used under a variety of environments even in a situation, where information is entered in a public space such as within a train, a airplane or the like. Accordingly, under the environment where a personal digital assistant is shared, as first described, the personal digital assistant preferably provides a widest possible range of viewing angle of the screen, such that a displayed screen can be simultaneously viewed by a plurality of persons. On the other hand, when a personal digital assistant is used in a public place, as second described, an excessively wide range of viewing angle would allow others to look into the screen, thus failing to keep information secret and protect privacy. Accordingly, in such a use environment, the range of viewing angle is preferably limited to such an extent that the user alone can view the screen.

For responding to such requirements for the range of viewing angle, a micro-louver film restricts beams from spreading after they have been emitted from a light source or a display device. The micro-louver film comprises light absorbing slats arranged on a film surface at equal intervals. The slats have a certain height with respect to a direction perpendicular to the film surface, so that an incident beam substantially parallel with the orientation of the slats, i.e., a beam impinging substantially perpendicular onto the film surface can transmit the micro-louver film, whereas light impinging onto the film surface at a large angle to the orientation of the slats, i.e., light obliquely impinging onto the film surface is absorbed by the slats and cannot therefore transmit the micro-louver film. Methods of manufacturing such micro-louver films are disclosed for example, in JP-A-50-092751, WO92/11549, JP-A-6-305066, JP-A-6-294903, and WO02/41048.

Each of JP-A-50-92751 and WO92/11549 discloses a method of manufacturing a micro-louver film by alternately laminating a transparent film and a thin light-absorptive film, melting and compressing the resulting laminate to form a block of a desired thickness, and slicing the micro-louver film from the block in a direction perpendicular to the lamination plane.

A micro-louver film disclosed in JP-A-6-305066 has a structure as illustrated in FIG. 1, where between transparent base film 1 and protection transparent film 4, ionizing radiation-curing resin 2, ionizing radiation-curing resin 2', and photo-absorbent material 3 are arranged at equal intervals in an in-plane direction of the films. Here, protection transparent film 4 may be omitted. The following description will be focused on a process of manufacturing such a micro-louver film.

First, the process begins with the provision of a mold which is formed with linear salients and recesses of desired widths at a desired pitch on the bottom. Polytetrafluoroethylene (PTFE) is coated on surfaces of the mold except for the surfaces of vertical walls rising from the recesses. Next, a photo-absorbent composition is coated on the vertical walls by electrodeposition. Then, ionizing radiation-curing resin 2 is filled in the recesses of the mold, and transparent base film 1 is placed on and bonded to ionizing radiation-curing resin 2. Next, ultraviolet (UV) rays are irradiated to cure ionizing radiation-curing resin 2 to form a molding of the ionizing radiation-curing resin with the photo-absorbent material to form a laminate film which is then removed from the mold. Ionizing radiation-curing resin 2' is again filled and cured in recesses of the laminate film, followed by smoothing the surface of the resulting laminate film. Consequently, a micro-louver film is provided as illustrated in FIG. 1. It should be noted that the laminate film manufactured by a process described above in FIG. 1 is not provided with protection transparent film 4. When protection transparent film 4 is added, ionizing radiation-curing resin 2' and laminate film are covered with transparent film 4 after ionizing irradiation-curing resin 2' has been filled, and subsequently, ionizing radiation-curing resin 2' may be cured.

A micro-louver film described in JP-A-6-294903 has a structure as illustrated in FIG. 2, where between transparent base 75 and protection transparent film 78, light absorbers 76 in a desired pattern and optically transparent resin 77 are alternately arranged in an in-plane direction of the films. A method of manufacturing this micro-louver film will be described below. First, material for forming a light absorber is coated over the entire surface of transparent base 75, and a resist for sandblasting is coated on the material in a predetermined thickness, and exposed and developed for forming the pattern of vertically rising light absorbers 76. In this process, a sandblast mask is formed on the light absorber forming material in accordance with a desired pattern. Then, the resulting laminate film is sandblasted through the mask, followed by peeling off the masking resist using a remover. In this process, light absorbers 76 are formed to vertically rise on transparent base 75. Subsequently, UV-curing acrylic resin is coated to fill in gaps between light absorbers 76, and excessive resin is scraped off. The resulting laminate is then irradiated with UV rays. Subsequently, protection transparent film 78 is bonded to the laminate with an adhesive to protect the surface of the laminate. Consequently, the micro-louver film is manufactured as illustrated in FIG. 2. The micro-louver film described in JP-A-6-294903 employs the sandblasting which is anisotropic processing that can achieve a high aspect ratio, so that the photo-absorbent layer can be patterned in a high aspect ratio, which facilitates the control of a range of angle over which beams can spread, according to JP-A-6-294903.

On the other hand, micro-louver 83, i.e., light control element described in WO02/41048, has a structure as illustrated in FIG. 3, where optically transparent film 80A having light absorption areas 81A is arranged on optically transparent film 80B having light absorption areas 81B. A method of manufacturing this micro-louver will be described below. First, each of optically transparent films 80A, 80B is formed with grooves or columnar recesses by molding, casting and extrusion, and/or direct mechanical processing. Next, a light absorbing material is filled in or coated on the grooves or columnar recesses to form light absorption areas 80A, 80B. Then, two optically transparent films 81A, 81B having light absorption areas 80A, 80B, respectively, are bonded to each other with an optically clear adhesive or the like such that light absorption areas 80A, 80B align to each other, thereby completing micro-louver 83.

However, some problems still remain unsolved in the conventional micro-louver films described above.

A first problem lies in difficulties in providing micro-louver films of large areas at low cost due to a large number of manufacturing processes and complicated processes involved in the manufacturing.

For example, in JP-A-50-092751 and WO92/11549, a transparent film and a thin photo-absorbent film are alternately laminated multiple times to form a block, where difficulties are experienced in forming a large film having a uniform thickness, particularly, the thin photo-absorbent film. Also, as the micro-louver film is increased in area, the block must be formed by laminating a larger number of films, resulting in a higher cost and a longer time required for the manufacturing. In addition, difficulties are also experienced in cutting a largest possible and longest possible thin film, with a uniform thickness, from the block made of the laminated films. Even if such a large and long film can be cut from the block, the film suffers from an optically asperous surface and therefore requires a smoothing process, which may involve heating and pressing, for example, leading to a further increase in cost.

The manufacturing method described in JP-A-6-305066 involves a step of forming light absorbers on side surfaces of recesses in a mold, integrating the light absorbers with the ionizing radiation-curing compound or resin to form a molding, and removing the molding from the mold. Therefore, as the micro-louver film will is larger, more difficulties are experienced in accurately controlling the thickness of the light absorbers. Consequently, the light absorbers vary in thickness, resulting in variations in controlling the spreading of light on the surface of the base film to reduce the yield of the micro-louver film. Further, this manufacturing method involves complicated processes and an inevitably large number of steps because the ionizing radiation-curing compound must be again filled and cured, and then processed to smooth its surface after the laminate film is removed from the mold.

The manufacturing method described in JP-A-6-294903 requires the steps of coating, exposing, developing, and peeling off the sandblast masking resist, in addition to the sandblasting intended for the light absorber forming material, in order to form the light absorbers in a desired pattern on the transparent base. This results in an increased number of manufacturing processes and expensive products. In addition, since the sandblasting is used in manufacturing the micro-louver film, the transparent base can be roughen on the surface, and an abrasive can remain on the surface, possibly result in a lower yield.

In the micro-louver described in WO02/41048, an optically transparent film undergoes molding, casting and extrusion, and/or direct machining to form therein grooves or columnar recesses. This manufacturing method requires a large side wall angle to the side wall of the formed groove or columnar recess, causing an impediment to a higher aspect ratio of the light absorbing element. Further, from a viewpoint of manufacturing, it is essentially difficult to provide a single film with a structure having a light absorbing element with a high aspect ratio, which can fully exert the function of louver. For this reason, the micro-louver described in WO02/41048 achieves a higher aspect ratio by providing two optically transparent films each having light absorption areas adjacent to each other. However, with the requirements for the steps of forming grooves or recesses in each of two optically transparent films, filling or coating a photo-absorbent material in or on the grooves or recesses, and adhering the two optically transparent films to each other, WO02/41048 suffers from an increased number of manufacturing processes and a higher cost.

A second problem in the micro-louvers according to the related arts lies in limitations in a direction in which spreading light is limited.

In JP-A-50-092751 and WO92/11549, since a transparent film and thin photo-absorbent film are laminated to create a block as described above, micro-louvers manufactured thereby can simply have a linear pattern which includes the alternation of transparent areas 7 and light absorption areas 5 on the surface of the substrate, as illustrated in FIG. 4. In other words, the light absorption areas cannot be formed to have an arbitrary pattern on the surface of the substrate. Consequently, the resulting micro-louver can restrict light from spreading only in direction 6 in which transparent areas 7 alternate with light absorption areas 5. In a method of overcoming a problem of the ability to control spreading light only in one direction, two micro-louver films are laminated such that their light absorption areas are arranged in a lattice pattern, when viewed from above. This method, however, uses at least two micro-louver films, resulting in an increased thickness of the overall film and a higher cost of the micro-louver.

A third problem in the micro-louvers according to the related arts lies in difficulties in simultaneously achieving a high light transmittance and limiting a range of angle over which beams can spread.

For example, in JP-A-6-294903 which can pattern a photo-absorbent layer with a high aspect ratio, a micro-louver film shown in one embodiment includes light absorbers, each of which has a width of 40 µm, and which are arranged at a pitch of 120 µm. From these dimensions, the transmittance is calculated to be 66.67% (=(120 µm−40 µm)/120 µm), excluding contributions due to losses by reflections on the interface and the like. On the other hand, some commercially available micro-louver films exhibit a transmittance of approximately 65% including losses due to reflections on the interface and the like. In other words, the micro-louver film shown in JP-A-6-294903, though having the photo-absorbent layer which can be patterned with a high aspect ratio, simply exhibits even a lower transmittance than those currently available on the market, in consideration of the losses due to reflections on the interface. Also, since this micro-louver film suffers from the roughened surface of the transparent base due to the sandblasting, and difficulties in completely removing the abrasive, the micro-louver film will disperse transmitted light to further reduce the transmittance. The roughened surface of the base and the remaining abrasive are impediments in uniformly filling the photo-curing resin. Further, the sandblasting tends to advance wider on the bottom (i.e., a surface in contact with the base) of the absorbers to result in tapered recesses. This causes a reduction in aperture ratio, i.e., the ratio of the transparent area to the pitch to further reduce the light transmittance.

The light absorber may be reduced in width in order to improve the light transmittance. JP-A-6-294904 describes that a sandblast mask can be formed to have a line width of several micrometers, but does not describe that the light absorber itself can be processed at this pitch. With the current sandblasting techniques, the processed light absorber has a line width which has a lower limit of approximately 20 μm, thus encountering difficulties in improving the transmittance.

Generally, the optically transparent resin may be increased in width for improving the light transmittance. However, as a wider width of the optically transparent resin results in a lower ratio of the height of the light absorber to the width of the optically transparent resin, beams can transmit the louver over a wider range of incident angle, thus degrading the performance of the micro-louver film.

As appreciated from the foregoing, the related arts have still left an unsolved problem of difficulties in simultaneously achieving a high light transmittance and limiting the range of angle over which beams can be incident on the micro-louver film.

SUMMARY OF THE INVENTION

It is an object of the present invention to provide a method of manufacturing a beam direction control element which achieves high light transmittance while maintaining high directivity to permit transmitted light to highly straightly pass therethrough.

It is another object of the present invention to provide a beam direction control element which achieves high light transmittance while maintaining high directivity to permit transmitted light to highly straightly pass therethrough.

It is a further object of the present invention to provide a variety of devices, such as a light source, a display device and the like, which employ a beam direction control element which achieves high light transmittance while maintaining high directivity to permit transmitted light to highly straightly pass therethrough.

The objects of the present invention are achieved by a method of manufacturing a beam direction control element having transparent areas and light absorption areas alternately arranged on a surface of a substrate, wherein the light absorption areas function as a louver for controlling the direction of a beam of light. The method comprises a transparent pattern forming step for disposing an optically transparent material on a first transparent substrate to form transparent ridges which constitute the transparent areas, a fluid filling step for filling curable and photo-absorptive fluid in gaps between the transparent ridges, and a fluid curing step for curing the fluid to form the light absorption areas.

In the manufacturing method of the present invention, since the thickness of the light absorption areas in the beam direction control element is dominated by the thickness of the transparent ridges, the thickness of the light absorption areas can be readily controlled to increase the aspect ratio of the light absorption areas, and improve the transmittance of the beam direction control element while maintaining a certain range of angle in which beams spread. The aspect ratio of the light absorption area, used herein, refers to the ratio of the height to the width in the cross section of the light absorption area.

In the present invention which has characteristics as described above, the transparent ridges are preferably formed by patterning based on a photolithography process. When the transparent ridges are formed by the photolithography process, the beam direction control element can be prevented from a reduced transmittance which would otherwise be caused by a roughened surface of the substrate and a residual abrasive, involved in the sandblasting, thus making it possible to exhibit a higher transmittance than before. With the use of a photolithography process based on stepper exposure, the same transparent ridges can be repetitively exposed over the entire substrate to readily provide a beam direction control element having a larger area.

It has been conventionally thought that the formation of transparent ridges having a sufficient aspect ratio is difficult depending on the lithography process, but, as will be later described, the present invention allows for the formation of transparent ridges which have an appropriate aspect ratio required for the beam direction control element, i.e., micro-louver by use of, for example, a negative photoresist which contains glycidylether derivative of bisphenol A novolac and cures through polymerization which advances with the aid of an acid generated from a photo-curing initiator as a catalysis.

By incorporating such a beam direction control element into a display screen of a terminal device, information can be kept secret, and privacy can be protected when the terminal device is used in a public place or in public traffic facilities.

Accordingly, the manufacturing method of the present invention can manufacture a beam direction control element which achieves a high light transmittance with a small range of angles over which transmitted light is emitted therefrom. Also, the present invention can form a pattern of light absorption areas in an arbitrary shape on the surface of a substrate in such a beam direction control element, and can manufacture beam direction control elements of larger areas at a low cost. In addition, the present invention can provide light sources and display devices which employ such a beam direction control element.

DETAILED DESCRIPTION OF THE PREFERRED EMBODIMENTS

Figure 5:
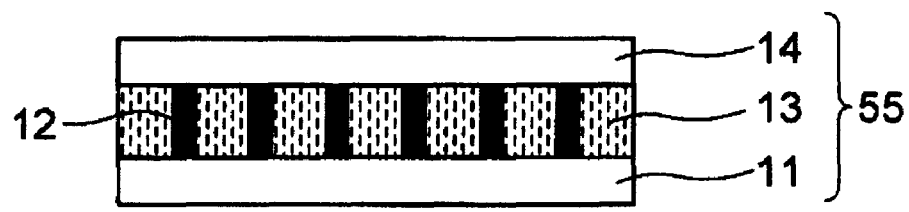
FIG. 5 is a cross-sectional view illustrating the structure of a beam direction control element according to a first embodiment of the present invention.
Figure 6:
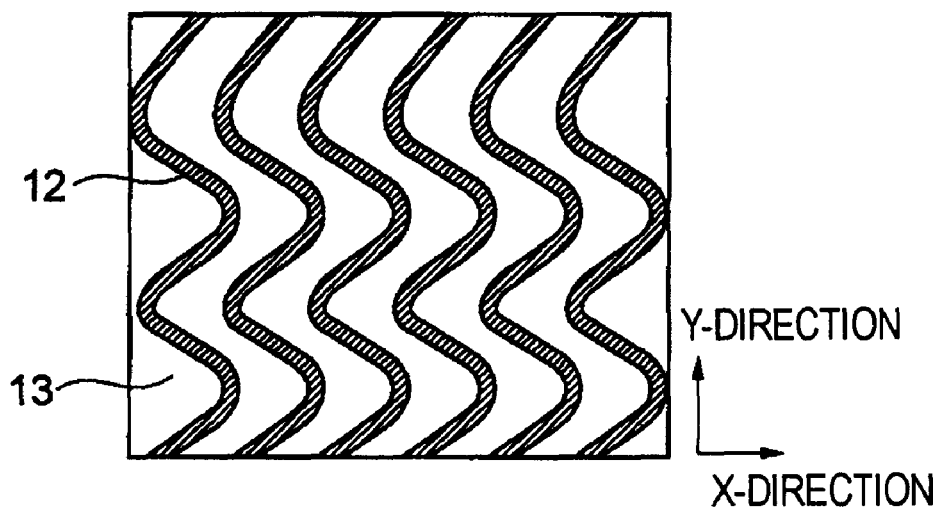
FIG. 6 is a plan view illustrating a layout pattern of light absorption areas in the beam direction control element illustrated in FIG. 5.

FIGS. 5 and 6 illustrate beam direction control element (i.e., micro-louver) 55 according to a first embodiment of the present invention which comprises light absorption areas 12 and transparent areas 13 made of a photo-curing material, which alternate on the surface of substrate 11. As can be seen in the structure shown in a cross-sectional view of FIG. 5, beam direction control element 55 has transparent areas 13 arranged at regular intervals between two transparent substrates 11, 14, and light absorption areas 12 which are filled in gaps between these transparent areas 13. Since beam direction control element 55 includes light absorption areas 12 disposed adjacent to transparent areas 13 in this way, light incident on transparent areas 13 through substrate 11 or 14 at small angles, i.e., light substantially perpendicular to the surface of the substrate, passes through transparent areas 13, whereas light incident at large angles is absorbed by light absorption areas 12. Here, light absorption areas 12 functions as a louver for controlling a beam direction, such that incident light can be limited in a certain range of angle by passing the incident light through beam direction control element 55.

As illustrated in a plan view of FIG. 6, light transparent areas 13 form a transparent pattern as a whole, when viewed from the surface of any substrate in beam direction control element 55. Specifically, light absorption areas 12 are formed in a repetition pattern such that each light absorption area 12 appears in a continuous sinusoidal shape. With such a shape, light absorption areas 12 exist in any direction on the surface of the substrate, as viewed from incident light, so that the incident light can be limited in a certain range of angle in any direction on the surface of the substrate.

Figure 7A:
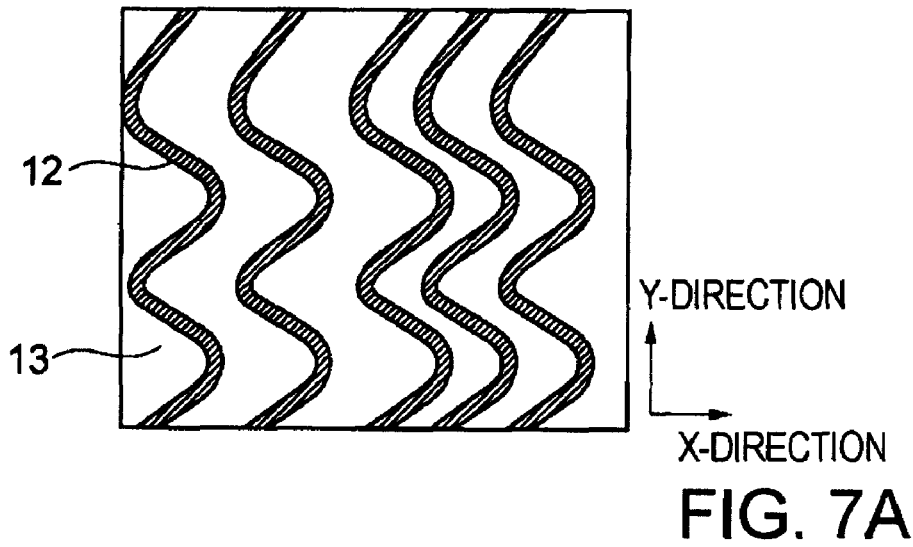
FIGS. 7A to 7F are plan views each illustrating a different example of a layout pattern of light absorption areas in the beam direction control element illustrated in FIG. 5.
Figure 7B:
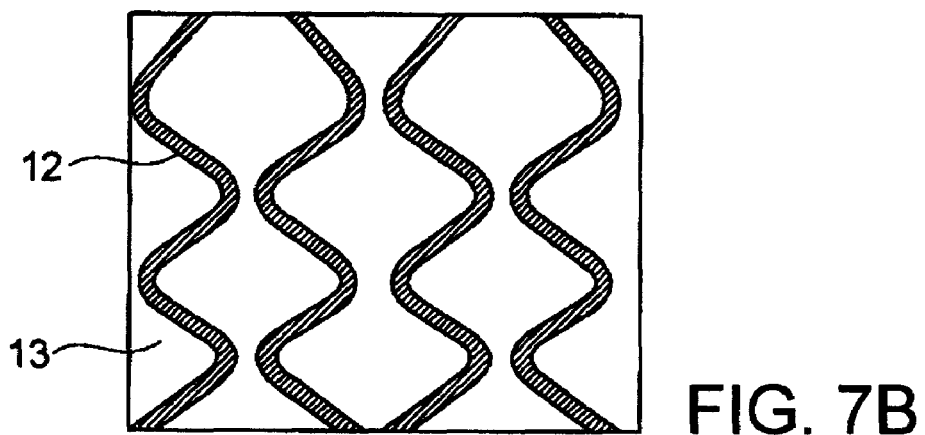

It should be understood that light absorption areas 12 in the beam direction control element of this embodiment are not limited in shape or layout to the sinusoidal ones arranged at regular intervals on the surface of the substrate, as illustrated in FIG. 6. For example, as illustrated in FIG. 7A, a plurality of sinusoidal light absorption areas 12 which have a uniform width may be arranged on the surface of substrate 11 such that transparent areas 13 vary in width between adjoining light absorption areas 12 in the alternating pattern. In this arrangement, while light absorption areas 12 are not repeated at regular intervals in x-direction, the resulting beam direction control element still provides similar advantages to the foregoing. Alternatively, a plurality of sinusoidal light absorption areas 12 extending in y-direction may be shifted by 180 degrees in phase between the respective light absorption areas adjacent in x-direction, as illustrated in FIG. 7B, in which case the resulting beam direction control element still provides similar advantages to the foregoing.

While light absorption areas 12 are defined to have the shape of a periodic curve which extends in y-direction as shown, the x-direction and y-direction are defined herein simply for purposes of convenience, and the direction of the periodic curves need not be defined as described above. Moreover, light absorption areas 12 are not limited to periodic curves, but may be formed in any curves as long as they have a plurality of curved areas.

Figure 1:
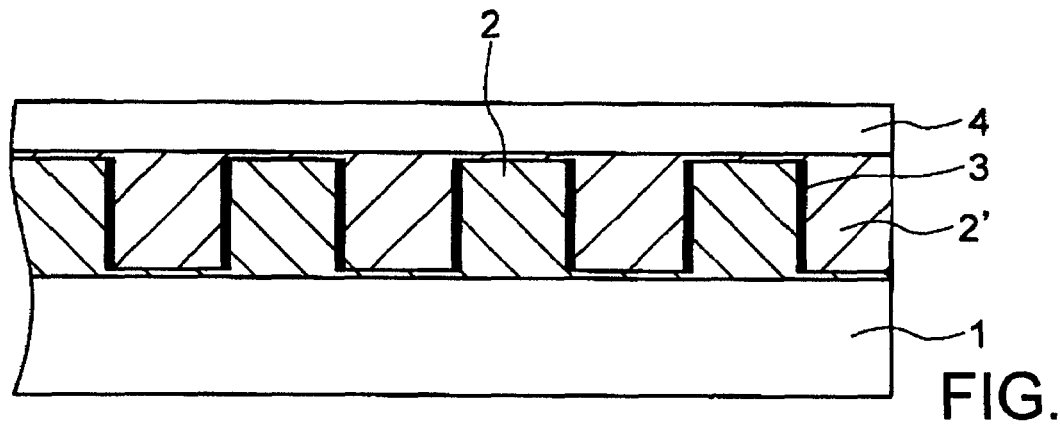
FIG. 1 is a cross-sectional view illustrating the structure of an exemplary micro-louver film of the related art.
Figure 2:
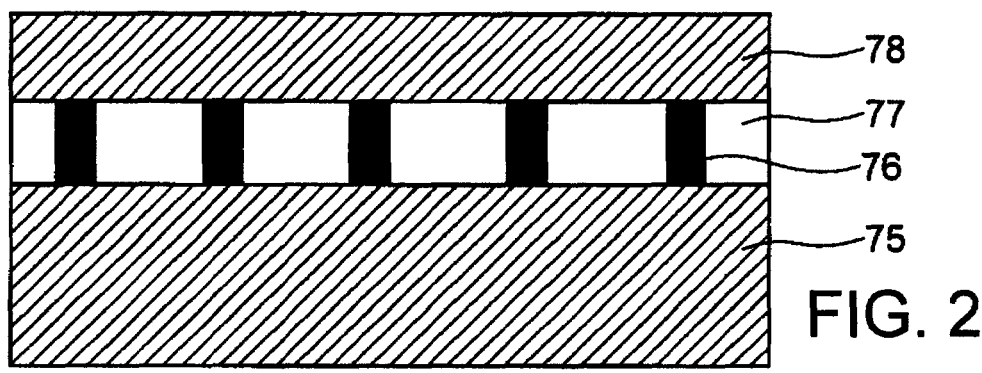
FIG. 2 is a cross-sectional view illustrating the structure of another exemplary micro-louver film of the related art.
Figure 3:
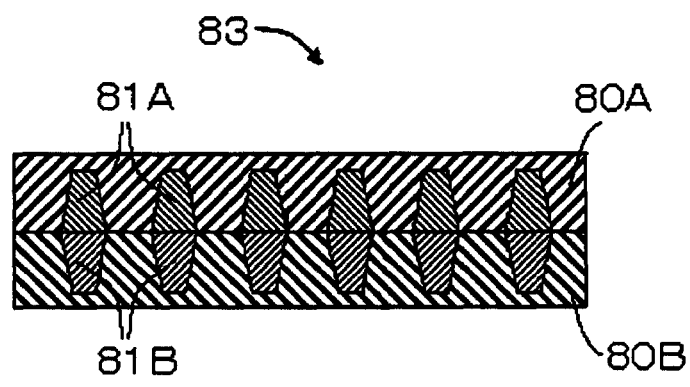
FIG. 3 is a cross-sectional view illustrating the structure of an exemplary micro-louver of the related art.
Figure 4:
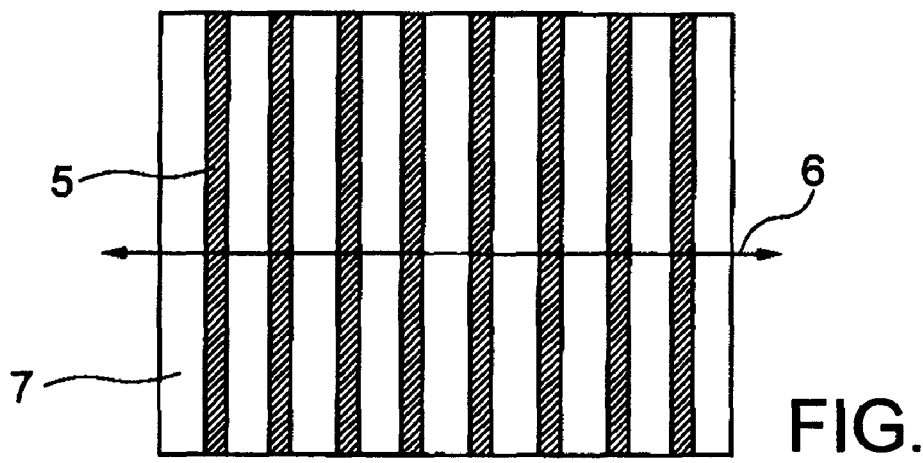
FIG. 4 is a plan view illustrating a general structure of a micro-louver film of the related art.

As described above, in the beam direction control element of this embodiment, the light absorption areas can be formed to have any of a polygonal line shape, a curved shape, a lattice shape, and a reticular shape, viewed from the direction perpendicular to the surface of the substrate, such that the beam direction control element can limit light to a range of angle in any direction. The light absorption areas in such shapes cannot be formed by the conventional method which involves alternately laminating a photo-absorbent film and a transparent film, melting and compressing the resulting laminate to form a block of a desired thickness, and slicing a micro-louver film from the block in the direction perpendicular to the lamination plane. It should be emphasized that the light absorption areas in such shapes can be formed exclusively by the method of the present invention. Of course, the method of the present invention can also readily manufacture a beam direction control element which has linear light absorption areas 12 arranged at regular intervals or at a varying pitch on a substrate, for example, as illustrated in FIG. 4.

Figure 7C:
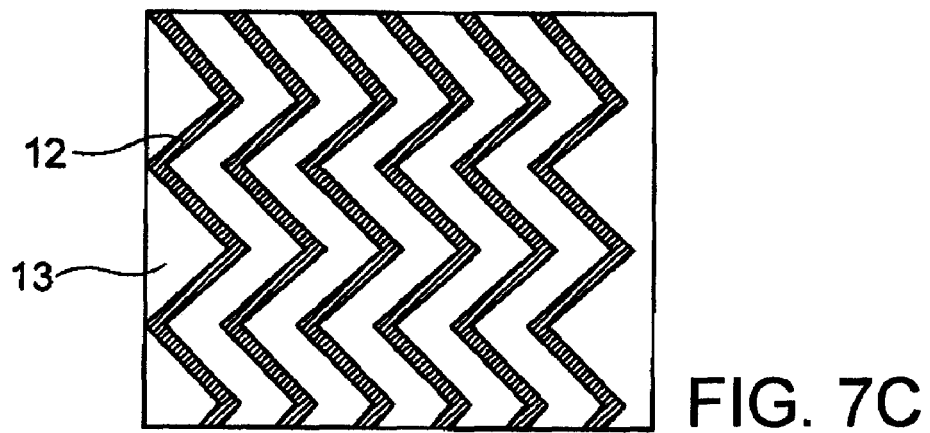
Figure 7D:
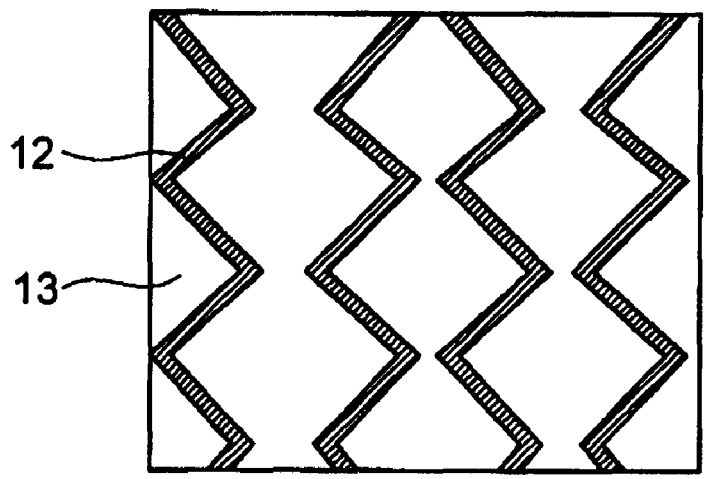
Figure 7E:
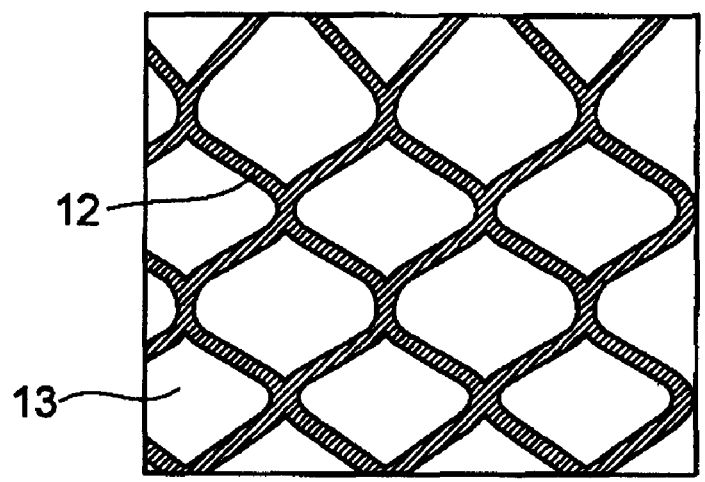
Figure 7F:
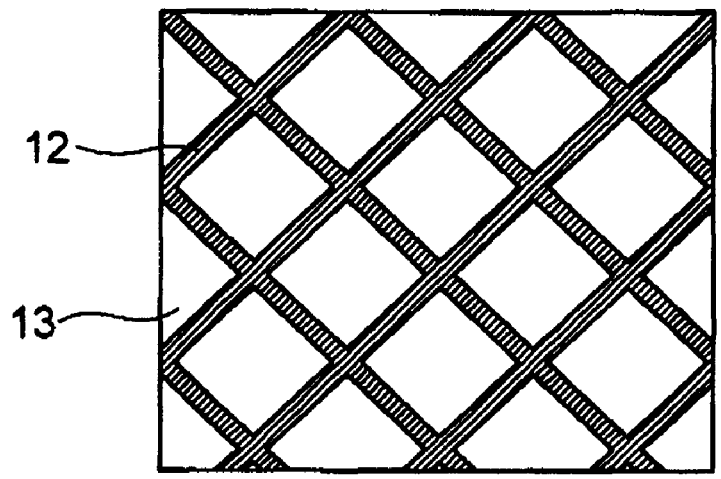

As described above, beam direction control element 55 of this embodiment may be formed with a plurality of light absorption areas 12 in polygonal line shape as illustrated in FIG. 7C or 7D or in reticular shape or lattice shape as illustrated in FIG. 7E or 7F. Even when light absorption areas 12 are formed in such a polygonal line shape, reticular shape, or lattice shape, the beam direction control element of this embodiment can provide similar advantages to the foregoing.

Beam direction control element 55 of this embodiment is characterized in that the aspect ratio of light absorption areas 12 can be increased, as compared with conventional beam direction control elements, to increase the light transmittance while maintaining a certain range of angle over which beams are incident thereon, by manufacturing beam direction control element 55 in a photolithography process using a photo-curing material. The aspect ratio, used herein, refers to the ratio of height to line width, as previously mentioned.

In this type of beam direction control element (i.e., micro-louver), incident light is limited in angle over a range which is dominated by the refractive index of the material which forms light transparent areas 13 and the aspect ratio of the transparent ridges. Since light transparent areas 13 are formed with ridge shape by the photolithography process, each patterned portion of light transparent areas 13 is also referred to a transparent ridge. For example, assuming that transparent areas 13 each has a refractive index of 1.5, a width of 50 μm, a pitch of 60 μm, and a height of 100 μm, the resulting transparent ridge has the aspect ratio of 2, permitting the beam direction control element to limit incident light away from the normal direction on the surface of the substrate by 42.13 degrees or more. For more strictly limiting the range of angle for the incident light, the aspect ratio may be increased in principle. Here, the pitch of transparent areas 13 refers to a period at which transparent areas 13 are periodically arranged. In the example shown herein, light absorption areas 12 have a line width of 10 μm since the pitch is 60 μm and the ridge width is 50 μm.

When line widths of the transparent areas and light absorption areas are chosen to be equal to or less than wavelengths of visible light, respectively, incident light polarizes because the light absorption areas absorb incident light which vibrates in the width direction of the light absorption areas. Such a beam direction control element can be used as a wire grid type polarizer, though it has the same structure as the micro-louver. This type of polarizer is also characterized by emitting highly directive light.

Next, a method of manufacturing the beam direction control element according to the first embodiment will be described with reference to FIGS. 8A to 8E.

Figure 8A:
FIGS. 8A to 8E are cross-sectional views illustrating in order a method of manufacturing the beam direction control element illustrated in FIG. 5.

First, a transparent ridge forming process for disposing an optically transparent material on a first transparent substrate to form transparent ridges which constitute the light transparent areas is executed. As illustrated in FIG. 8A, a first step in the transparent ridge forming process is a transparent layer forming step which involves coating transparent substrate 11 with a photo-curing material in a thickness in accordance with the transparent ridges to form transparent layer 39. The photo-curing material is transparent in a visible light. Substrate 11 may be a glass substrate or a film substrate as long as it is a transparent substrate which transmits at least light at wavelength of 365 nm or more. In this event, a method of coating the photo-curing material can be selected as appropriate from viewpoints of, for example, the viscosity of the photo-curing material and productivity. The coating method may include, for example, a spin-coat method, a bar coat method, a screen printing method, an ink jet method, a slit die coater method and the like. Alternatively, a dry film may be transferred onto a substrate. In this event, when the dry film is thinner than a desired thickness, the dry film may be laminated again until the desired thickness is reached. Furthermore, a supporting base of a dry film may be used as substrate 11 in this embodiment. After substrate 11 is coated with a photo-curing material, substrate 11 may be pre-baked using an electric furnace or a hot plate.

Here, the photo-curing material used for transparent layer 39 was chemically amplified photoresist (trade name: SU-8) available from Kayaku MicroChem Corporation and other distributors. This photo-curing material is an epoxy-based negative-resist which polymerizes a curable monomer using proton acid as a catalysis, and the proton acid is generated from a photo-curing initiator by irradiating the photo-curing material with UV rays at wavelength of 365 nm. More specifically, the photo-curing material is a negative-resist of glycidylether derivative of bisphenol A novolac. Also, this photo-curing material characteristically exhibits high transparency in the visible light region. The curable monomer contained in this photo-curing material has a relatively small molecular weight before curing and is therefore highly soluble into solvents such as cyclopentanone, propylene glycol methyl ether acetate (PEGMEA), γ-butyl lactone (GBL), isobutyl keton (MIBK) and the like, lending itself to the formation of a thick film. Further, with its high light transparency at wavelength in a near-UV region, even a thick film made of the photo-curing material transmits UV rays.

This photo-curing material can form a pattern of high aspect ratio equal to or larger than five by virtue of the characteristics as mentioned above. Since the curable monomer contains a number of functional groups, the curable monomer, after cured, is highly densely cross-linked to become not only thermally but also chemically very stable, and facilitate processing after the formation of the pattern. The chemical structure of this photo-curing material (trade name: SU-8) is disclosed, for example, in J. M. Shaw, J. D. Gelorme, N. C. LaBianca, W. E. Conley and S. J. Holmes, "Negative photoresists for optical lithography," IBM J. Res. Develop., Vol. 41, No. 1/2, pp. 81-94 (1997). Of course, the photo-curing material for use in the present invention is not limited to the one introduced herein (trade name: SU-8), but any photo-curing material may be used as long as it has similar characteristics.

Figure 8B:
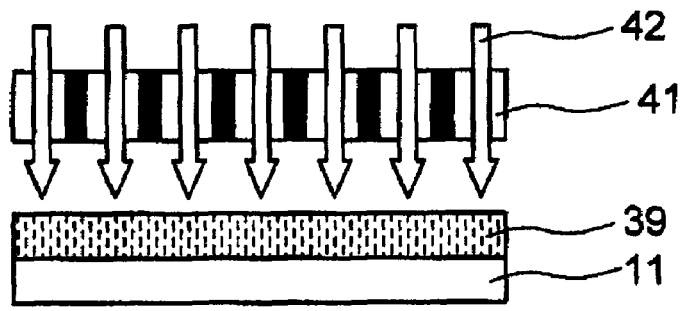

Next, a patterning process for patterning the transparent layer by a photolithography process using a photomask corresponding to the transparent ridges to form the transparent ridges made of the cured photo-curing material on the first substrate is carried out In the patterning process, as illustrated in FIG. 8B, transparent layer 39 formed on substrate 11 is exposed to UV rays 42 through a photomask 41 having a predetermined transparent pattern. Transparent layer 39 is irradiated with UV rays 42 from the direction perpendicular to the surface of the substrate 11. In this way, portions of transparent layer 39 irradiated with UV rays 42 are optically cured, whereas portions of transparent layer 39 covered with photomask 41 remain uncured. Subsequently, transparent layer 39 may be post-baked as required.

Figure 8C:

Next, as illustrated in FIG. 8C, transparent layer 39 is developed using a dedicated developer to remove uncured portions of the optically transparent material. In this way, transparent ridge 40 having a high aspect ratio is formed on substrate 11 using a photolithography process, thus completing transparent areas 13 of beam direction control element 55.

Figure 8D:
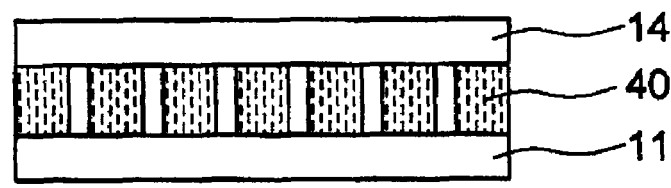

Next, in a substrate lamination process illustrated in FIG. 8D, another transparent substrate 14 is brought into close contact with salients of transparent ridges 40 on substrate 11, and irradiated with UV rays or heated. With this process, transparent ridges 40 are completely cured and come into close contact with the other substrate 14. When the close contact between substrate 14 and transparent ridges 40 is not sufficient, an adhesive layer may be disposed on the surface of the other substrate 14 with which transparent ridges 40 should be brought into close contact. The adhesive layer available for the surface of substrate 14 may be made of a material which has a photo-curing property or a thermosetting property as long as the material is transparent. Alternatively, a curable sealing material may be coated along the periphery of substrate 11 to bring both substrates 11, 14 into close contact with each other. When the sealing material is coated, sealing material on the periphery of substrate 11 may be partially opened to allow for a filling step later performed. With this substrate lamination process, two substrates 11, 14 are brought into close contact through transparent ridges 40 and substrate 14 is laminated on transparent ridged 40 on substrate 11, resulting in the formation of gaps, the size of which is equal to the thickness of transparent ridges 40.

In this embodiment, substrate 14 which is brought into close contact with the transparent ridges 40 on substrate 11 is not limited to a transparent substrate, but may be a color filter substrate or an active matrix substrate used in display devices, or may alternatively be a translucent substrate such as a polarizing film. The active matrix substrate is, for example, a thin film transistor (TFT) substrate or a thin film diode (MIM; metal-insulator-metal) substrate or the like.

Figure 8E:
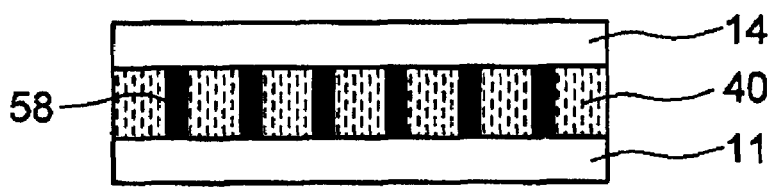

Next, in a fluid filling process as illustrated in FIG. 8E, photo-absorbent fluid 58 is filled in or injected into the gaps between transparent areas 40, utilizing the capillary action. Photo-absorbent fluid 58 has properties of being fluid during the process and curable with heat, light or the like. After the fluid filling process, fluid 58 is cured with, for example, UV rays or heat in a fluid curing process. With these processes, light absorption areas 12 are formed in beam direction control element 55 of this embodiment. When fluid 58 is not sufficiently cured, fluid 58 may be again cured with UV rays or heat. In this embodiment, fluid 58 can be filled in the gaps between transparent ridges 40, utilizing the capillary action, to improve the yield. For this purpose, the fluid filling process is preferably performed in a vacuum or under a reduced pressure.

Here, photo-absorbent fluid 58 or filler may be an acrylic resin which contains carbon particles and can be cured using heat or UV rays or using UV rays together with heat, an epoxy resin which contains carbon black or black pigment and is cured with UV rays, or the like. However, the material which constitutes fluid 58 or filler is not limited to the foregoing materials, but any fluid can be used as long as it is curable and has at least a photo-absorbent property after it is cured. Also, when photo-absorbent fluid 58 is hydrophilic, fluid 58 can be smoothly filled in the gaps between transparent areas 40 by previously making the surface of transparent areas 40 hydrophilic by surface treatment of transparent areas 40. When the surface of transparent areas 40 is hydrophobic, fluid 58 having a hydrophobic property can be chosen as well.

As described above, the manufacturing method in this embodiment fills curable fluid 58 having the photo-absorbent property in the gaps between transparent ridges 40 formed between two substrates 11, 14, and cures fluid 58 to create beam direction control element 55, resulting in an improved yield. Also, with the elimination of the need for the surface smoothing process, as compared with the conventional methods, the method of this embodiment reduces the number of manufacturing processes and can manufacture the beam direction control element at a lower cost.

Since this manufacturing method creates transparent ridges 40 by a photolithography process using a photo-curing material capable of forming ridges with a high aspect ratio, the aspect ratio can be increased in the light absorption areas, i.e., the ratio of the height to the width in the cross section of the light absorption area, thus making it possible to manufacture a large-area beam direction control element as well. Accordingly, this method can increase the light transmittance while maintaining the controllability for a range of angle in which beams can be incident. In particular, the method can advantageously change limitations on the range of angle for incident light as desired through changes in the design of photomask 41. Further, since this method enables the formation of a precise pattern in arbitrary shape within the surface of the substrate, the beam direction control element can be manufactured to adapt to a variety of applications. For example, when the line widths of the transparent areas and light absorption areas are chosen to be equal to or less than wavelengths of visible light, the beam direction control element absorbs incident light which vibrates in the width direction of the light absorption areas, so that the beam direction control element can be used as a polarizer.

It should be noted that in this embodiment, substrate 14 is not always required, provided that fluid 58 can be filled in the gaps between transparent ridges 40 which have been formed on substrate 11 by the action of the capillary effect. When substrate 14 is omitted, the beam direction control element can be manufactured at a lower cost reduced by the cost of the substrate 14.

A second embodiment of the present invention will be described.

Though similar to the beam direction control element of the first embodiment described above, a beam direction control element of the second embodiment differs from the first embodiment in transparent protection layer 91 substituted for substrate 14 and a method of manufacturing the beam direction control element. FIGS. 9A to 9D are diagrams for describing the method of manufacturing the beam direction control element according to the second embodiment. Manufacturing processes in the second embodiment differ from the manufacturing processes in the first embodiment in that the substrate lamination process is performed following a process for filling a curable photo-absorbent fluid.

Figure 9A:
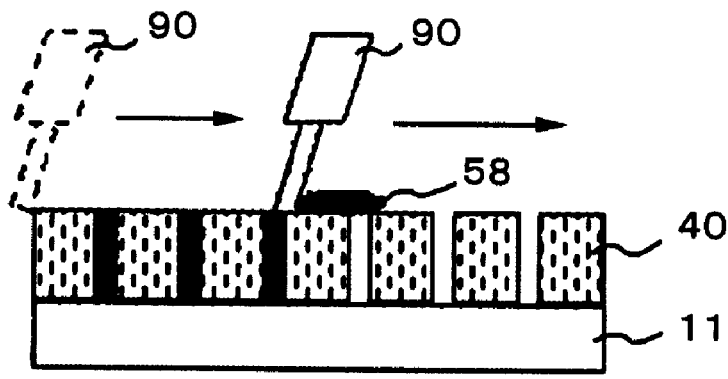
FIGS. 9A to 9D are cross-sectional views illustrating in order a method of manufacturing a beam direction control element according to a second embodiment of the present invention.

Similar to the first embodiment, transparent ridges 40 made of a photo-curing material is formed on substrate 11 using a photolithography process. Then, as illustrated in FIG. 9A, fluid 58 is applied to an end side of transparent ridges 40, and fluid 58 is spread or scanned to an end side on the opposite side using squeegee 90 to fill fluid 58 in gaps between transparent ridges 40. Fluid 58 used herein may be a curable photo-absorbent fluid, as in the first embodiment. The spreading or scanning should be performed so as to eliminate a clearance between squeegee and the surface of transparent ridges 40. In this way, fluid 58 hardly remains on the top surface of transparent ridges 40 after fluid 58 is spread or scanned by squeegee 90. Here, the top surface refers to the surface of transparent ridge 40 which will later be brought into contact with protection layer 91. When fluid 58 remains on the top surface of any transparent ridge 40, residual fluid 58 may be wiped off, or the surface of transparent ridge(s) 40 may be optically polished after fluid 58 is cured, thereby cleaning the top surface of transparent ridge(s) 40 such that any photo-absorbent members do not remain on the top surface of any transparent ridge 40. The filling process is preferably performed in a vacuum in order to reduce defective filling which involves the introduction of void, foreign substances and the like into the gaps between transparent ridges 40.

Figure 9B:
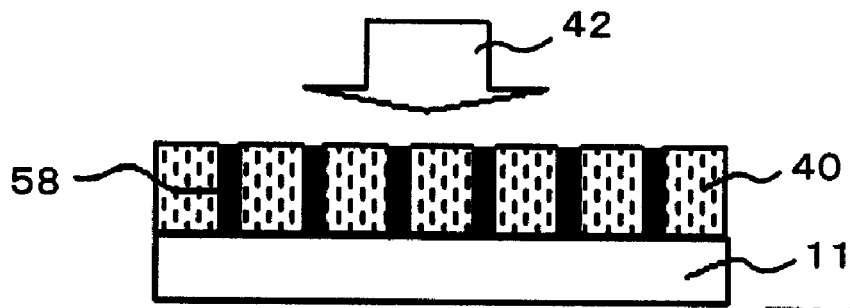
Figure 9C:
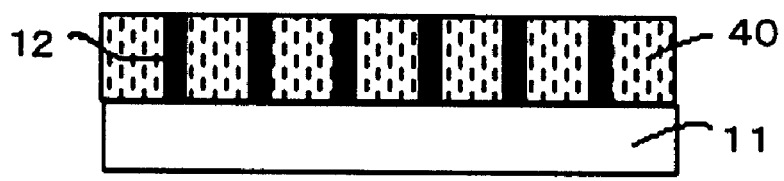
Figure 9D:
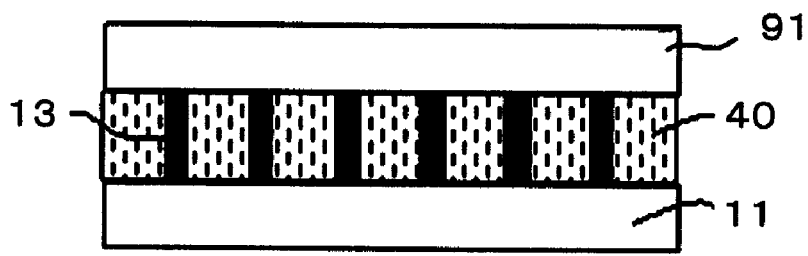

Next, as illustrated in FIG. 9B, UV rays 42 are irradiated from the side opposite to substrate 11 to cure fluid 58. With this process, light absorption areas 13 are formed as illustrated in FIG. 9C to complete the beam direction control element. Subsequently, protection layer 91 is disposed on the surface of the beam direction control element, as illustrated in FIG. 9D. Protection layer 91 used herein may be substrate 14 in the first embodiment, a hard coat layer, a removable adhesive layer, an anti-reflection layer, or a laminate of these layers. Alternatively, protection layer 91 may be omitted.

While the second embodiment employs a different approach from that of the first embodiment to fill and cure a curable photo-absorbent fluid in the gaps between the transparent ridges, the beam direction control element according to the second embodiment provides similar advantages to those of the beam direction control element according to the first embodiment.

A third embodiment of the present invention will be described.

Though similar to the beam direction control elements of the first and second embodiments, a beam direction control element of the third embodiment differs from those of the first and second embodiments in that the beam direction control element of the third embodiment is manufactured using two substrates, each of which is formed with transparent ridges.

Figure 10A:
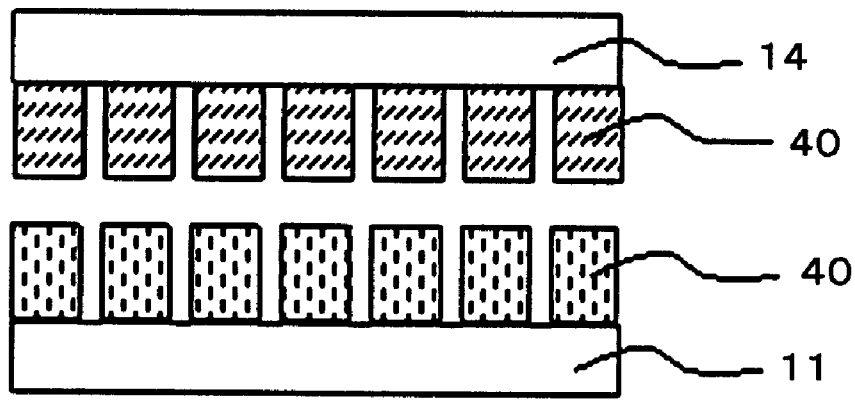
FIGS. 10A to 10C are cross-sectional views illustrating in order a method of manufacturing a beam direction control element according to a third embodiment of the present invention.
Figure 10B:
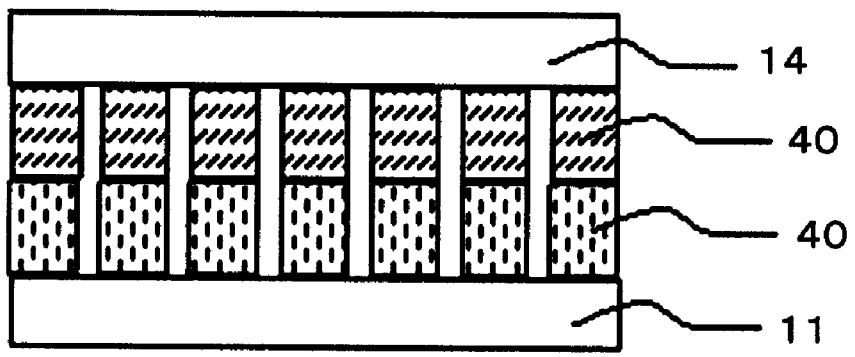
Figure 10C:
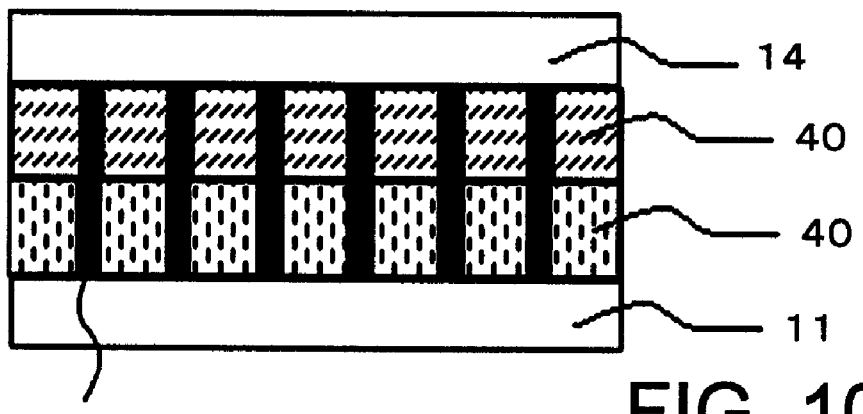

FIGS. 10A to 10C are diagrams for describing a method of manufacturing such a beam direction control element of the third embodiment.

First, as illustrated in FIG. 10A, transparent ridges 40 made of a photo-curing material is formed on each of substrates 11, 14 by a photolithography process. The photo-curing material which constitutes transparent ridges 40 may be the same as that used in the first and second embodiments. Here, the transparent ridges formed on substrate 11, 14 may be transparent ridges having a high aspect ratio similar to those in the first and second embodiments, or transparent ridges which have an aspect ratio approximately one-half of the aspect ratio of the transparent ridges in the first and second embodiments.

Next, salients of transparent ridges 40 on both substrates 11, 14 are aligned to each other using matching markers or the like to bring the salients into close contact with each other. In this event, a transparent adhesive layer may be formed on peak surfaces of the salients of the transparent ridges on either substrate, and then transparent ridges 40 on both substrates 11, 14 may be brought into close contact with each other. For forming the transparent adhesive layer only on the peak surfaces of the salients, the salients of the transparent ridges may be brought into contact with a flat surface which has been previously coated with a uniform transparent adhesive layer, just like a stamp is pressed against an inkpad such that the stamp is applied with ink. However, the way the transparent adhesive layer is disposed is not limited to the foregoing, but any method may be used as long as the transparent adhesive layer can be formed on the peak surfaces of the salients of the transparent ridges.

Next, while the salients of the transparent ridges 40 on both substrates 11, 14 remain in close contact with each other, transparent ridges 40 on both substrates 11, 14 are closely adhered to each other by irradiating the laminate with UV rays, or by applying heat to the laminate, or using both UV rays and heat. In this way, the transparent ridges 40 are bonded on their interfaces, thereby making it possible to prevent a fluid from introducing into the interface in a subsequent filling process. Then, as illustrated in FIG. 10C, fluid 58 is filled in gaps between transparent ridges 40 sandwiched by both substrates 11, 14, and fluid 58 is cured by UV rays or heat to form the beam direction control element of the third embodiment. Fluid 58 used herein may be a curable light absorption fluid similar to those used in the first and second embodiments.

According to the third embodiment, transparent ridges 40 each having an aspect ratio similar to that in the first and second embodiments are formed on both substrates 11, 14, so that the aspect ratio can be substantially increased twice as much as the first and second embodiments, thus limiting transmitted light in a narrower range. Alternatively, transparent ridges 40 each having an aspect ratio one-half as much as that in the first and second embodiments can be formed on both substrates 11, 14 and brought into close contact to result in the substantially same aspect ratio as that in the first and second embodiments. Further alternatively, the aspect ratio of transparent ridges 40 on one substrate 11 and the aspect ratio of transparent ridges 40 on the other substrate 14 can be arbitrarily set such that a desired aspect ratio is accomplished as a whole.

As described above, according to the third embodiment, the beam direction control element can be readily manufactured to have a higher aspect ratio, as compared with a beam direction control element which has transparent ridges formed only on one substrate. For other aspects, the third embodiment provides similar advantages to those of the first and second embodiments.

A fourth embodiment of the present invention will be described.

Figure 11A:
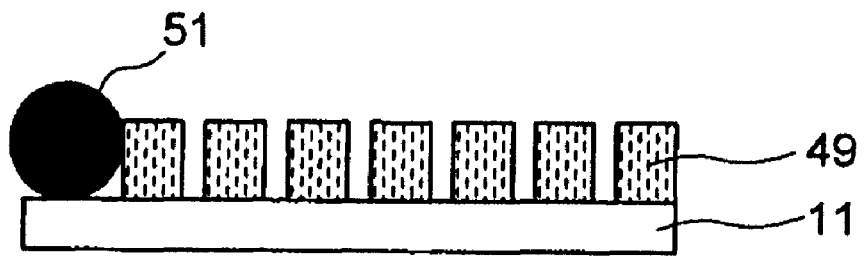
FIGS. 11A to 11C are cross-sectional views illustrating in order a method of manufacturing a beam direction control element according to a fourth embodiment of the present invention.
Figure 11B:
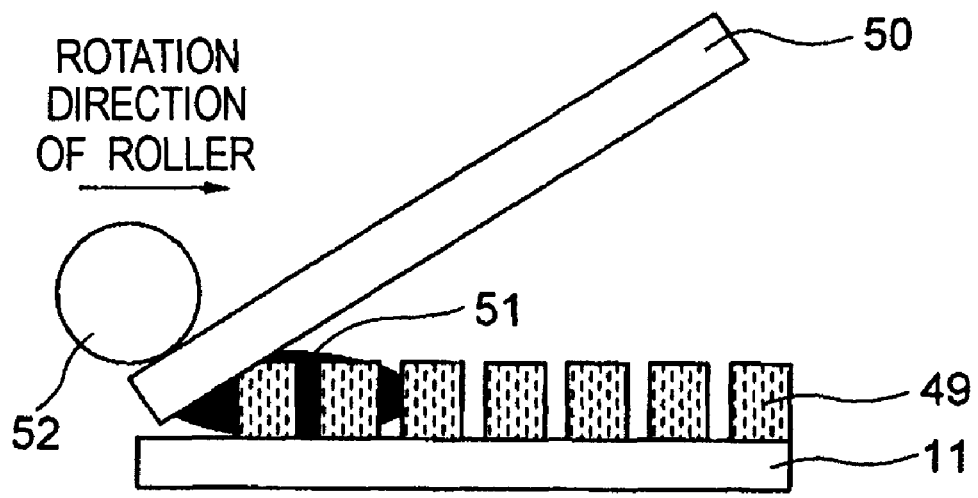
Figure 11C:
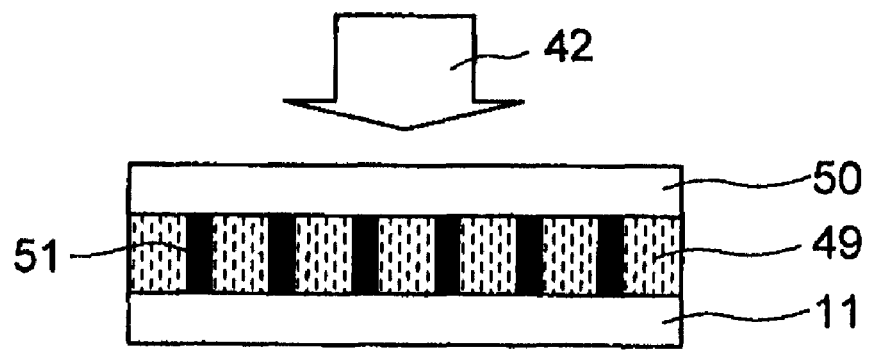

Though similar to the beam direction control element of the first embodiment, a beam direction control element of the fourth embodiment is manufactured by a different method. FIGS. 11A to 11C are diagrams for describing the method of manufacturing the beam direction control element according to the fourth embodiment.

First, transparent ridges 49 are created on substrate 11 in a procedure similar to those in the first to third embodiments, and then, photo-absorbent curable fluid material 51 is coated on substrate 11 on which transparent ridges 49 have been formed, as illustrated in FIG. 11A. Curable fluid material 51 used herein is a fluid material which has properties of being photo-absorptive and curable when irradiated with UV rays or the like, i.e., a photo-curing fluid material, but not limited thereto, a thermosetting material or the like may be used instead. Curable fluid material 51 is preferably formed of a colored material including black. Subsequently, in a curable fluid spreading process as illustrated in FIG. 11B, one end of transparent substrate 50 is placed on curable fluid material 51, and substrate 50 is adhered to substrate 11 while curable fluid material 51 is spread by scanning or pressing roller 52 or the like on substrate 50 from one end side to the other end side thereof.

Next, as illustrated in FIG. 11C, two substrates 11, 50 adhered to each other are irradiated with UV rays 42 from above one of two substrates 11, 50 to cure curable fluid material 51. When a thermosetting fluid material is used for curable fluid material 51, heat is applied to substrates 11, 50 instead of the irradiation of UV rays. In this way, the beam direction control element of the fourth embodiment is completed.

In the fourth embodiment as described above, since curable fluid material 51 is filled in the gaps of the transparent ridges while substrates 11, 50 are adhered to each other, the productivity is more improved. Accordingly, the beam direction control element can be manufactured at a lower cost. Further, the fourth embodiment can significantly improve the productivity as compared with a single sheet process (i.e., batch process), because the beam direction control element can be manufactured using a rolled film for the substrate by forming the transparent ridges using a roll-to-roll technique, and filling and curing the curable material.

A fifth embodiment of the present invention will be described.

Figure 12A:
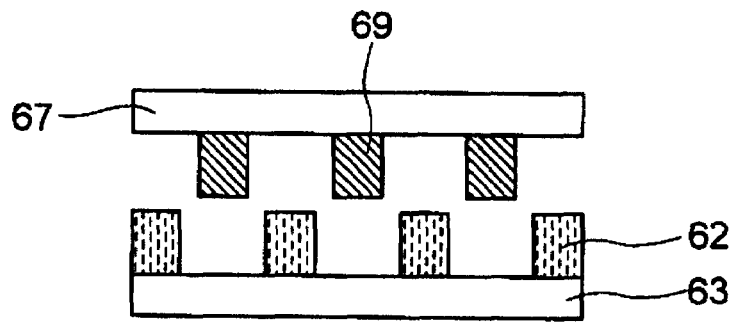
FIGS. 12A to 12C are cross-sectional views illustrating in order a method of manufacturing a beam direction control element according to a fifth embodiment of the present invention.
Figure 12B:
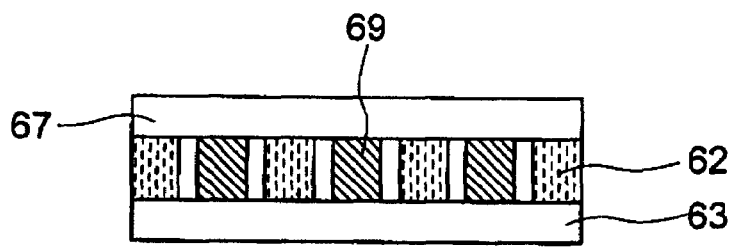
Figure 12C:
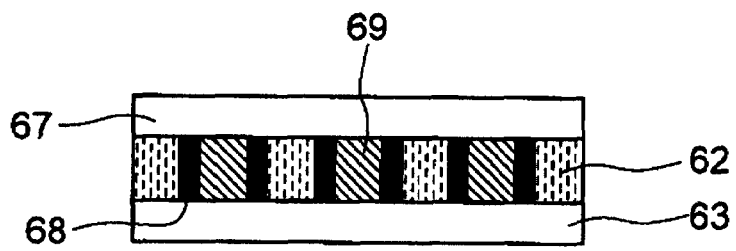

A beam direction control element of the fifth embodiment is manufactured using two substrates, each of which has been formed with transparent ridges, in a manner similar to the third embodiment, but the beam direction control element of the fifth embodiment differs from that of the third embodiment in that transparent ridges on both the substrates are arranged in a staggered format, more specifically, salients of the transparent ridges on one substrate are brought into close contact with the other substrate without matching to salients of the transparent ridges on the other substrate. FIGS. 12A to 12C are diagrams for describing a method of manufacturing such a beam direction control element of the fifth embodiment.

First, as illustrated in FIG. 12A, substrate 63 having transparent ridges 62 and substrate 67 having transparent ridges 69 are created in a procedure similar to the procedures in the first to fourth embodiments. Then, as illustrated in FIG. 12B, substrates 63, 67 are aligned to each other, such that transparent ridges 62, 69 do not match to each other, and substrates 63, 67 are brought into close contact with each other through transparent ridges 62, 69. Subsequently, as illustrated in FIG.

12C, fluid 68 is filled in gaps between substrates 63, 67, and cured to complete the beam direction control element. Fluid 68 used herein can be the fluid used in the first to third embodiments.

Figure 13A:
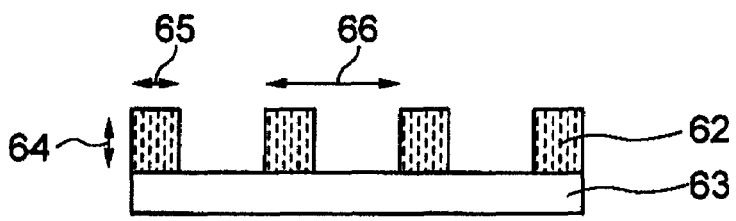
FIGS. 13A and 13B are cross-sectional views illustrating a beam direction control element which is manufactured with a transparent ridge formed only on one substrate.
Figure 13B:
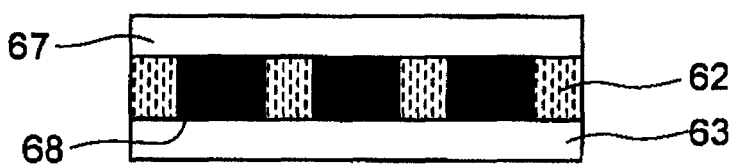

The fifth embodiment can increase the aspect ratio of the light absorption areas, as compared with a beam direction control element which has transparent ridges formed only on one substrate, by bonding two substrates 63, 67 having transparent ridges 62, 69, in the manner described above. For example, when a beam direction control element is manufactured with a substrate formed with a transparent salient/recess pattern, where transparent salient areas, each having width 65 of 100 µm and thickness 64 of 100 µm are arranged at pitch 66 of 220 µm, as illustrated in FIG. 13A, the aspect ratio of the light absorption area is 5/6 in the beam direction control element (see FIG. 13B) having transparent ridges 62 only on one substrate, whereas the aspect ratio of the light absorption area is increased to as high as 10 in the beam direction control element of the fifth embodiment, where two substrates 63, 67 having transparent ridges 62, 69, respectively, are bonded to each other as illustrated in FIG. 12C.

The fifth embodiment can facilitate the manufacturing of a beam direction control element including light absorption areas with a high aspect ratio, as compared with a beam direction control element which has an transparent ridge formed only on one substrate. For other aspects, the fifth embodiment provides similar advantages to those of the first embodiment.

A sixth embodiment of the present invention will be described.

Figure 14A:
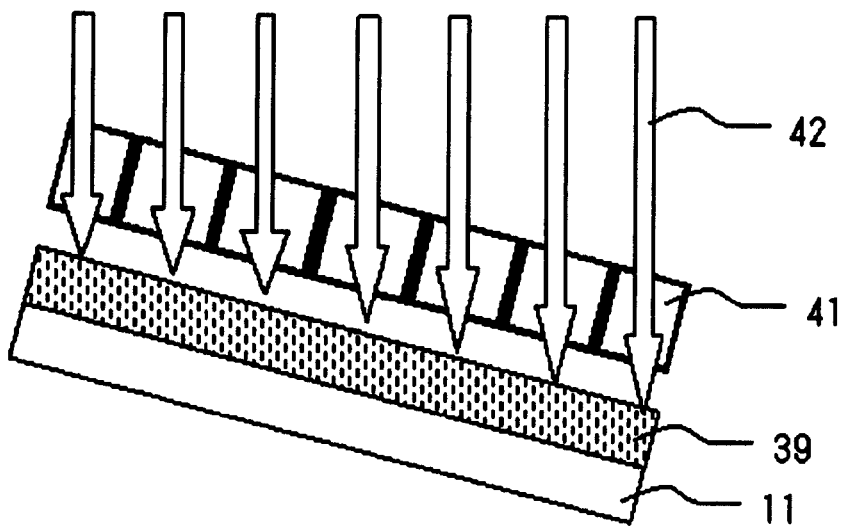
FIGS. 14A to 14C are cross-sectional views illustrating in order a method of manufacturing a beam direction control element according to a sixth embodiment of the present invention.
Figure 14B:
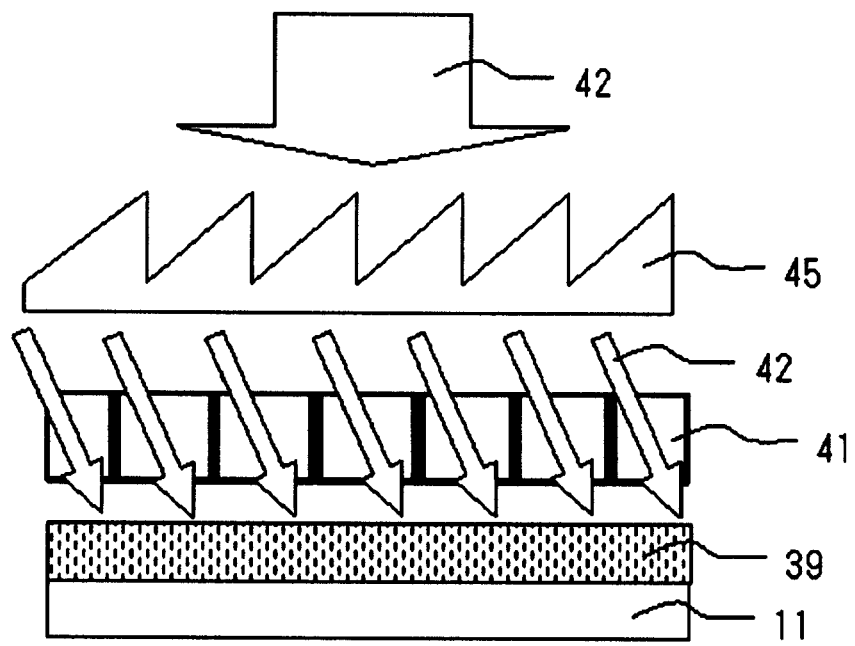
Figure 14C:

Though similar to the beam direction control element of the first embodiment, a beam direction control element of the sixth embodiment differs from that of the first embodiment in that UV rays are irradiated from an oblique direction with respect to the surface of the substrate when the photo-curing material is exposed to the UV rays and patterned to form transparent ridges. FIGS. 14A to 14C are diagrams for describing a method of manufacturing such a beam direction control element of the sixth embodiment.

As illustrated in FIG. 14A, after photomask 41 is placed above transparent layer 39 on substrate 11, they are irradiated with UV rays 42 from an oblique direction with respect to substrate 11 for exposure by inclining them or otherwise inclining a UV ray source. Alternatively, as illustrated in FIG. 14B, a beam angle changing element, for example, microprism array 45 may be placed above photomask 41, and UV rays 42 may be directed to the beam angle changing element from above. By thus exposing transparent layer 39 from an oblique direction, resulting transparent ridges 40 incline with respect to substrate 11. Subsequently, photo-absorbent fluid 58 is filled and cured to complete a beam direction control element which has light absorption areas in an asymmetric configuration to the direction perpendicular to the surface of substrate 11. This beam direction control element can limit incident light in an asymmetric range of angle.

Figure 15:
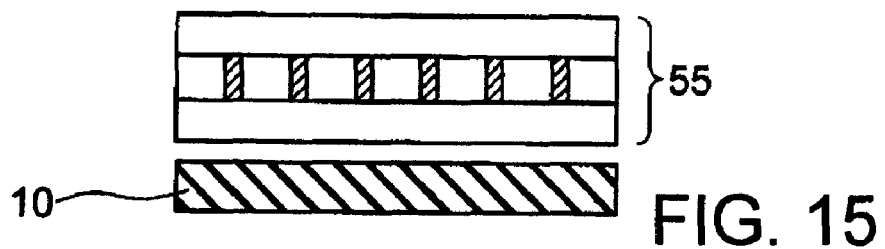
FIG. 15 is a cross-sectional view illustrating a surface light source in a seventh embodiment of the present invention.

A description will be given of a seventh embodiment of the present invention which is a surface light source using the beam direction control element according to the present invention. FIG. 15 is a cross-sectional view illustrating the surface light source of the seventh embodiment.

The illustrated surface light source comprises beam direction control element 55 according to the present invention disposed on light source 10, and is capable of emitting directive light. Light source 10 used herein may be a side-light type back light or a direct-under type back light which employs a white light emitting diode (white LED) or a cold cathode ray tube as a light source, an inorganic electroluminescence (EL) element, an organic EL element or the like. Beam direction control element 55 used herein may be a beam direction control element similar to any of those in the first to sixth embodiments. This surface light source has the advantage of limiting the range of light emitted from light source 10 in accordance with particular applications by designing the light absorption areas in beam direction control element 55 in shape and arrangement.

Figure 16:
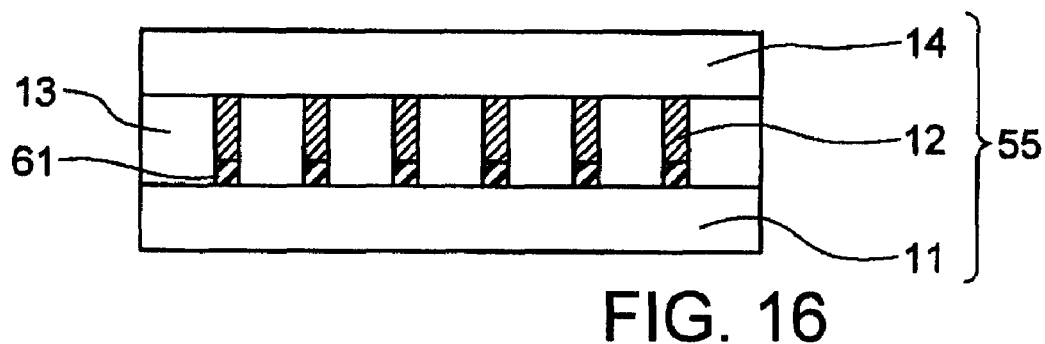
FIG. 16 is a cross-sectional view illustrating a beam direction control element used in the surface light source illustrated in FIG. 15.

Further, as illustrated in FIG. 16, beam direction control element 55 may be additionally provided with reflective film 61 made of aluminum or the like on the surface of light absorption areas 12 closer to the light source to reflect light from light source 10 which impinges on and is absorbed by light absorption areas 12, such that reflected light can be used again as source light to improve the use efficiency of light source 10. Such a beam direction control element can be manufactured in the following manner. An aluminum film is deposited on substrate 11 before the transparent layer is formed on substrate 11. The aluminum film is patterned into reflective films 61 such that the aluminum film remains only at positions at which reflective films 61 are formed (i.e., at positions at which light absorption areas 12 are formed). Subsequently, the respective processes are performed from the transparent layer forming process described above.

Figure 17:
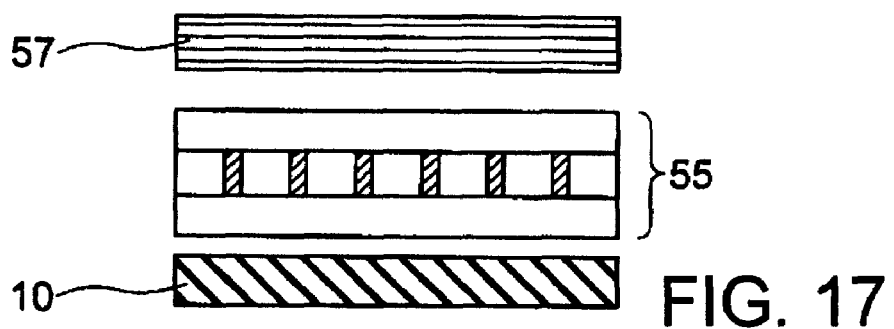
FIG. 17 is a cross-sectional view illustrating a display device which comprises an LCD panel disposed on the surface light source illustrated in FIG. 15.

As illustrated in FIG. 17, a display device may comprise LCD panel 57 disposed on the surface light source illustrated in FIG. 15. The illustrated display device can limit a range of viewing angle at which a screen displayed thereon is visible. Thus, this display device can keep information secret and protect privacy from an outsider who attempts to look into the screen. In addition, the beam direction control element can be manufactured in conformity to any particular display device for use therewith from the fact that the beam direction control element is abundant in shape variations. An additional advantage of the display device is to reduce the moire.

Figure 18:
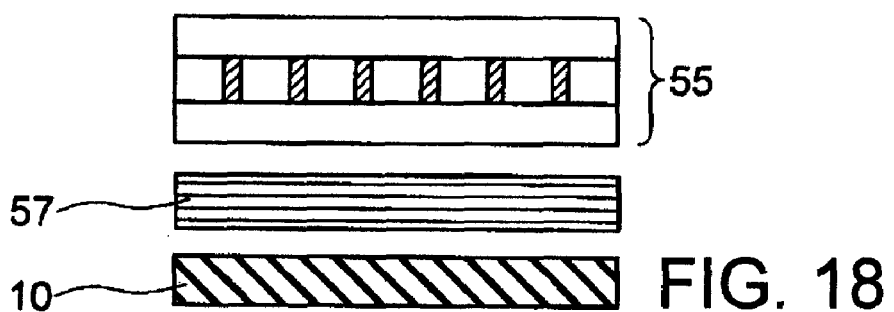
FIG. 18 is a cross-sectional view illustrating a display device according to an eighth embodiment of the present invention.

A description will be given of an eighth embodiment of the present invention which is another display device using the beam direction control element according to the present invention. FIG. 18 is a cross-sectional view illustrating the display device according to the eighth embodiment.

The illustrated display device comprises LCD panel 57 and beam direction control element 55 disposed on light source 10 which serves as a back light. Beam direction control element 55 used herein may be similar to any of the beam direction control elements in the first to sixth embodiments. LCD panel 57 used herein may be a transmissive LCD panel in the illustrated display device.

Since the display device comprises beam direction control element 55 disposed on the front side, which is opposite to the user, i.e., display screen of LCD panel 57, the display device can limit a range of viewing angle for LCD panel 57, allowing only the user right in front of LCD panel 57 to view contents displayed on LCD panel 57. Accordingly, the display device can keep information secret and protect privacy. While the foregoing description has been made in connection with the display device which employs transmissive LCD panel 57 for displaying a screen, the eighth embodiment can employ a semi-transmissive LCD panel instead of the transmissive LCD panel. Further, instead of a combination of light source 10 and transmissive LCD panel 57, the display screen can be provided by a reflective LCD, an organic EL display device, a plasma display device, and the like. In other words, the beam direction control element according to the present invention, when used in any type of display device, can limit a range of viewing angle for a screen displayed on the displayed device. Particularly, when the beam direction control element of the present invention is applied to a self-emitting display device such as an organic EL display device, a plasma display device and the like, the beam direction control element can satisfactorily control a range of viewing angles for these display devices.

By virtue of the abundance in shape variations, the beam direction control element of the present invention can be manufactured in conformity to particular specifications of a display device and a display screen in which the beam direction control element is employed, or in conformity to any particular situation in which the display device is used, and can provide the advantage of reducing moire which tends to occur when a display device is combined with a beam direction control element.

Figure 19:
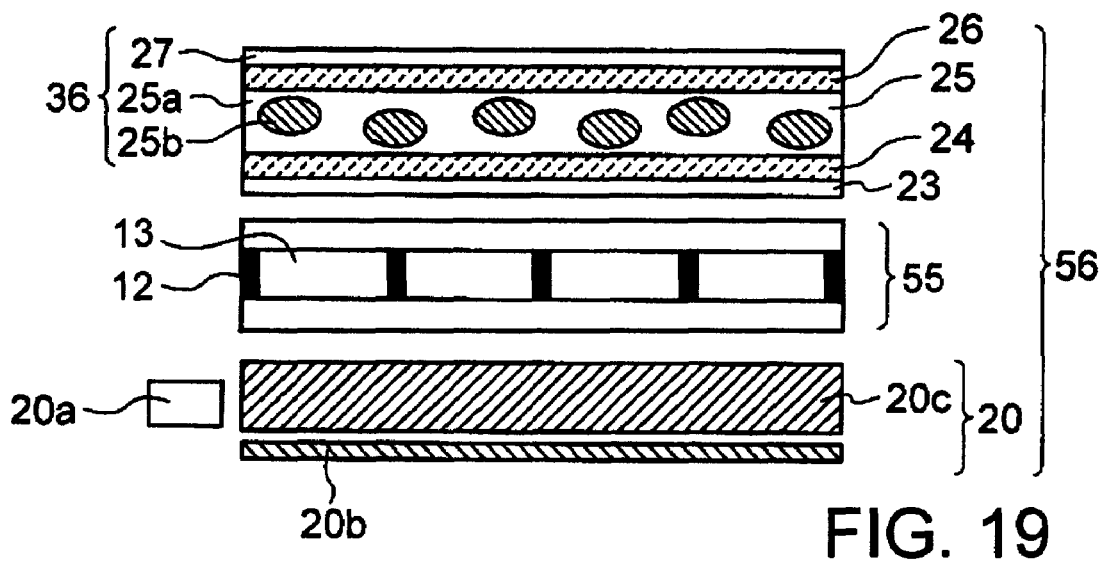
FIG. 19 is a cross-sectional view illustrating the configuration of a directivity switching light source according to a ninth embodiment of the present invention.

A ninth embodiment of the present invention will be described in connection with a directivity switching light source which employs the beam direction control element according to the present invention. FIG. 19 is a cross-sectional view illustrating the directivity switching light source according to the ninth embodiment.

Illustrated directivity switching light source 56 comprises beam direction control element 55, and transmission/dispersion element 36 capable of electrically switching a transparent state and a dispersion state. Beam direction control element 55 and transmission/dispersion element 36 are laminated in this order on surface light source 20. Beam direction control element 55 used herein may be similar to any of the beam direction control elements in the first to sixth embodiments.

Surface light source 20, which is a side-light type back light source, comprises light guide plate 20c, light source 20a disposed in close proximity to one end face of light guide plate 20c, and reflector 20b disposed along the back side of light guide plate 20c, i.e., the surface which is not a light emitting surface.

Transmission/dispersion element 36 includes polymer dispersed liquid crystal layer 25 sealed between a pair of substrates 23, 27. Electrodes 24, 26 are formed on surfaces of substrates 23, 27, respectively, which are in contact with polymer dispersed liquid crystal layer 25. Polymer dispersed liquid crystal layer 25 includes liquid crystal molecules 25b dispersed in polymer film 25a, and is designed to change the refractive index of liquid crystal molecules 25b in response to a voltage applied between electrodes 24, 26. With the foregoing structure, when the refractive index of liquid crystal molecules 25b substantially matches with the refractive index of polymer film 25a, polymer dispersed liquid crystal layer 25 directly passes beams which incident thereon. In other words, transmission/dispersion element 36 becomes transparent. On the other hand, when the refractive index of liquid crystal molecules 25b does not match with the refractive index of polymer film 25a, beams incident on polymer dispersed liquid crystal layer 25b are dispersed and emitted toward various directions. In other words, transmission/dispersion element 36 becomes dispersive. Accordingly, transmission/dispersion element 36 can be switched between the transparent state and dispersive state by changing the voltage applied between electrodes 24, 26.

The directivity switching light source of the ninth embodiment can switch the directivity of surface light source 20, i.e., spreading of light emitted therefrom, by electrically switching transmission/dispersion element 36 between the transparent state and dispersive state. Specifically, light emitted from surface light source 20 is substantially parallel when transmission/dispersion element 36 is in the transparent state, whereas emitted light spreads around when in the dispersive state. In this way, the present invention can provide the directivity switching light source which is capable of switching a range of angles over which emitted light can spread.

Figure 20:
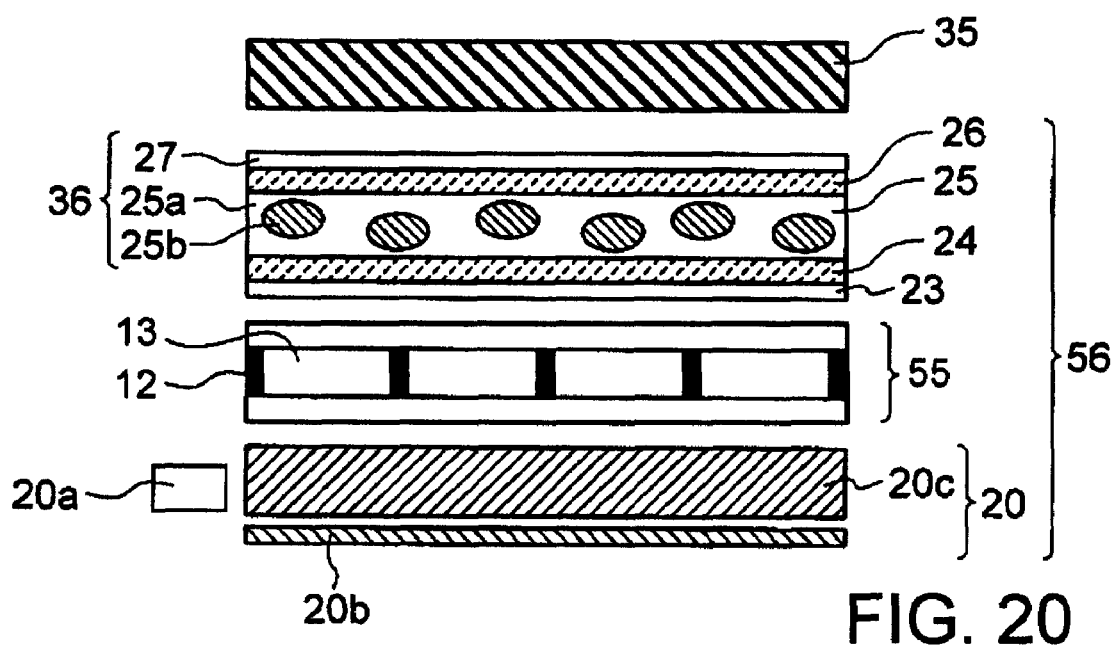
FIG. 20 is a cross-sectional view illustrating the configuration of a display device according to a tenth embodiment of the present invention.

A tenth embodiment of the present invention will be described in connection with another example of a display device which employs the beam direction control element according to the present invention. FIG. 20 is a cross-sectional view illustrating the display device of the tenth embodiment.

The illustrated display device comprises LCD panel 35 laminated on directivity switching light source 56 of the ninth embodiment. Therefore, the display device comprises beam direction control element 55, transmission/dispersion element 36, and LCD panel 35, which are laminated in this order on surface light source 20. Beam direction control element 55 used herein may be similar to any of the beam direction control elements in the first to sixth embodiments. Surface light source 20 and transmission/dispersion element 36 used herein may be similar to those used in the ninth embodiment.

The display device can control the spread of light emitted from surface light source 20 through beam direction control element 55 to vary the spread of light incident on LCD panel 35 by switching transmission/dispersion element 36 between the transparent state and dispersive state. Therefore, the range of viewing angle can be switched for the display device by controlling a voltage applied to transmission/dispersion element 36 to switch the same between the transparent state and dispersive state. When transmission/dispersion element 36 is switched to the dispersive state, the display device has a wider range of viewing angle, and can therefore be used in a wide field display mode for sharing information among a number of persons. Conversely, when transmission/dispersion element 36 is switched to the transparent state, the display device has a narrower range of viewing angle, and can therefore be used in a narrow field display mode when the user wishes to keep information secret, or protect privacy from others. In this way, the display device according to the tenth embodiment can be switched between the wide field display mode and narrow field display mode for use in accordance with a particular environment in which it is used. For example, a terminal device equipped with such a display device can select an appropriate mode for a displayed image in accordance with a use situation.

Further, this display device can reduce moire to restrain degradation in display definition because of its ability to set the shape and layout of the light absorption areas in beam direction control element 55 in accordance with specifications of the display device.

What is claimed is:

1. A method of manufacturing a beam direction control element having transparent areas and light absorption areas alternately arranged on a surface of a substrate, wherein said light absorption areas function as a louver for controlling direction of a beam of light, said method comprising:

disposing an optically transparent material on a first transparent substrate to form transparent ridges which constitute the transparent areas;

filling curable and photo-absorptive fluid in gaps between said transparent ridges;

curing the fluid to form the light absorption areas; and laminating a second translucent substrate in close contact with said transparent ridges on said transparent ridge, wherein said second translucent substrate is one of a color filter and a polarizing film, wherein the formation of transparent ridges comprises:

coating an optically transparent and photo-curing material on said first substrate in a thickness in accordance with said transparent ridges to form a transparent layer; and patterning said transparent layer by a photolithography process using a photomask corresponding to said transparent ridges to form the transparent ridges made of the cured photo-curing material on said first substrate, and wherein said filling of the fluid includes coating the fluid on said first substrate including said transparent ridges.

2. A method of manufacturing a beam direction control element having transparent areas and light absorption areas alternately arranged on a surface of a substrate, wherein said light absorption areas function as a louver for controlling direction of a beam of light, said method comprising:

disposing an optically transparent material on a first transparent substrate to form transparent ridges which constitute the transparent areas;

filling curable and photo-absorptive fluid in gaps between said transparent ridges;

spreading the curable fluid while bringing a second translucent substrate into close contact with said first substrate coated with the fluid, to adhere said second substrate to said first substrate; and curing the curable fluid to form the light absorption areas between said first transparent substrate and said second translucent substrate, wherein said second translucent substrate is one of a color filter and a polarizing film, wherein the formation of transparent ridges comprises:

coating an optically transparent and photo-curing material on said first substrate in a thickness in accordance with said transparent ridges to form a transparent layer; and patterning said transparent layer by a photolithography process using a photomask corresponding to said transparent ridges to form the transparent ridges made of the cured photo-curing material on said first substrate, and wherein said filling of the fluid includes coating the fluid on said first substrate including said transparent ridges.

3. A method of manufacturing a beam direction control element having transparent areas and light absorption areas alternately arranged on a surface of a substrate, wherein said light absorption areas function as a louver for controlling direction of a beam of light, said method comprising:

disposing an optically transparent material on a first transparent substrate to form transparent ridges which constitute the transparent areas;

filling curable and photo-absorptive fluid in gaps between said transparent ridges;

curing the fluid to form the light absorption areas; and placing a second translucent substrate on said first transparent substrate such that said second substrate comes into close contact with peak surfaces of salients of said transparent ridges, wherein said second translucent substrate is one of a color filter and a polarizing film, wherein the formation of transparent ridges comprises:

coating an optically transparent and photo-curing material on said first substrate in a thickness in accordance with said transparent ridges to form a transparent layer; and patterning said transparent layer by a photolithography process using a photomask corresponding to said transparent ridges to form the transparent ridges made of the cured photo-curing material on said first substrate, and wherein said filling of the fluid includes coating the fluid on said first substrate including said transparent ridges.

4. A method of manufacturing a beam direction control element having transparent areas and light absorption areas alternately arranged on a surface of a substrate, wherein said light absorption areas function as a louver for controlling direction of a beam of light, said method comprising:

disposing an optically transparent material on a first transparent substrate to form first transparent ridges which constitute the transparent areas;

disposing an optically transparent material on a second translucent substrate to form second transparent ridges which constitute the transparent areas;

placing said second substrate on said first substrate such that peak surfaces of salients of the first transparent ridges come into close contact with the surface of said second substrate, and such that peak surfaces of salients of the second transparent ridges come into close contact with the surface of said first substrate, filling curable and photo-absorptive fluid in spaces surrounded by said first substrate, said second substrate, said first transparent ridges, and said second transparent ridges, wherein said second translucent substrate is one of a color filter and a polarizing film.

5. The method according to claim 4, wherein the formation of first transparent ridges comprises:

coating an optically transparent and photo-curing material on said first substrate in a thickness in accordance with said first transparent ridges to form a first transparent layer; and patterning said first transparent layer by a photolithography process using a photomask corresponding to said first transparent ridges to form the first transparent ridges made of the cured photo-curing material on said first substrate, and wherein the formation of second transparent ridges comprises:

coating an optically transparent and photo-curing material on said second substrate in a thickness in accordance with said second transparent ridges to form a second transparent layer; and patterning said second transparent layer by a photolithography process using a photomask corresponding to said second transparent ridges to form the second transparent ridges made of the cured photo-curing material on said second substrate.

* * * * *